(12) United States Patent
Reynov et al.

(10) Patent No.: US 10,405,068 B1
(45) Date of Patent: Sep. 3, 2019

(54) COMPUTER NETWORK SWITCH FABRIC ASSEMBLY

(71) Applicant: Juniper Networks, Inc., Sunnyvale, CA (US)

(72) Inventors: Boris Reynov, Cupertino, CA (US); Shreeram Siddhaye, Sunnyvale, CA (US); Jack W. Kohn, Mountain View, CA (US); Venkata S. Raju Penmetsa, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/818,443

(22) Filed: Nov. 20, 2017

(51) Int. Cl.
*H04Q 1/16* (2006.01)
*H01R 13/70* (2006.01)
*H01R 12/72* (2011.01)

(52) U.S. Cl.
CPC ............ *H04Q 1/16* (2013.01); *H01R 12/721* (2013.01); *H01R 13/70* (2013.01)

(58) Field of Classification Search
CPC ......... H04Q 1/16; H01R 12/721; H01R 13/70
USPC ........................................................ 370/369
See application file for complete search history.

(56) References Cited

U.S. PATENT DOCUMENTS

| | | | | |
|---|---|---|---|---|
| 8,068,351 | B2 * | 11/2011 | Figueroa | H02G 3/30 361/788 |
| 9,413,097 | B2 * | 8/2016 | Tamarkin | H01R 13/502 |
| 2002/0099972 | A1 * | 7/2002 | Walsh | G06F 11/2005 714/10 |
| 2004/0110423 | A1 * | 6/2004 | Shishikura | G06K 7/0021 439/630 |
| 2005/0207134 | A1 * | 9/2005 | Belady | H05K 1/14 361/796 |
| 2006/0034061 | A1 * | 2/2006 | Grundy | H01R 23/70 361/785 |
| 2008/0084880 | A1 * | 4/2008 | Dharwadkar | H04L 12/4641 370/392 |
| 2008/0315985 | A1 * | 12/2008 | Johnsen | G06F 11/30 340/2.22 |
| 2012/0014391 | A1 * | 1/2012 | Du | H04L 49/60 370/419 |
| 2014/0360752 | A1 * | 12/2014 | Sechrist | H05K 7/1491 174/79 |
| 2015/0116976 | A1 * | 4/2015 | Ritter | H01B 7/2813 361/826 |

OTHER PUBLICATIONS

Lawrence, "NEXUS 9000—An exciting Introduction to Cisco Nexus 9000 Series Switches; Cisco's NX-OS Mode; The next generation of data center switching", 2013, 43 pages.

* cited by examiner

*Primary Examiner* — Stephen J Clawson
(74) *Attorney, Agent, or Firm* — Harrity & Harrity, LLP

(57) ABSTRACT

A network device may include multiple line cards and a switch fabric assembly electrically connected to the line cards. The switch fabric assembly includes: for each of the line cards, a line card connector providing electrical connectivity between the line card and one or more cables; a cable mesh assembly including the cables, the cables providing electrical connectivity between each line card connector and multiple switch connector groups; and multiple switch application specific integrated circuits (ASICs), each of the switch ASICs being electrically connected to one of the switch connector groups.

20 Claims, 5 Drawing Sheets

COMPUTER NETWORK SWITCH FABRIC ASSEMBLY

BACKGROUND

Network switches are computer networking devices that connect computing devices together on a network by using packet switching technology to receive, process, and forward data on the network. Network switches often include line cards that provide multiple ports for connecting computing devices to one another on the front-end of the switch and network fabric built into the back-end of the network switch for processing the network packets and forwarding them to the appropriate destination port/device.

SUMMARY

According to some implementations, a switch fabric assembly may include at least one line card connector, each of the at least one line card connector providing electrical connectivity between a line card and one or more cables; a cable mesh assembly including the one or more cables, the at least one cable providing electrical connectivity between each of the at least one line card connector and each of at least one switch connector group; at least one switch application specific integrated circuit (ASIC), each of the at least one switch ASIC having electrical connectivity with one of the at least one switch connector group; and a substrate physically supporting at least one of: the at least one line card connector, the cable mesh assembly, or the at least one switch connector group.

According to some implementations, a network switch may include a plurality of line cards; and a switch fabric assembly electrically connected to the plurality of line cards, the switch fabric assembly comprising: for each of the plurality of line cards, a line card connector connected to the line card, each line card connector providing electrical connectivity between the line card and one or more cables; a cable mesh assembly including the one or more cables, the one or more cables providing electrical connectivity between each line card connector and each of a plurality of switch connector groups; and a plurality of switch application specific integrated circuits (ASICs), each of the plurality of switch ASICs being electrically connected to one of the plurality of switch connector groups.

According to some implementations, a switch fabric assembly included in a network device may include a printed circuit board (PCB) to wire connector, the PCB to wire connector providing electrical connectivity between traces of a line card PCB and a cable; a cable mesh assembly including the cable, the cable providing electrical connectivity between the PCB to wire connector and a wire to PCB connector; a switch application specific integrated circuit (ASIC), the switch ASIC being electrically connected to the wire to PCB connector; and a substrate physically supporting at least one of: the PCB to wire connector, the cable mesh assembly, or the wire to PCB connector.

DETAILED DESCRIPTION

Figure 1A:
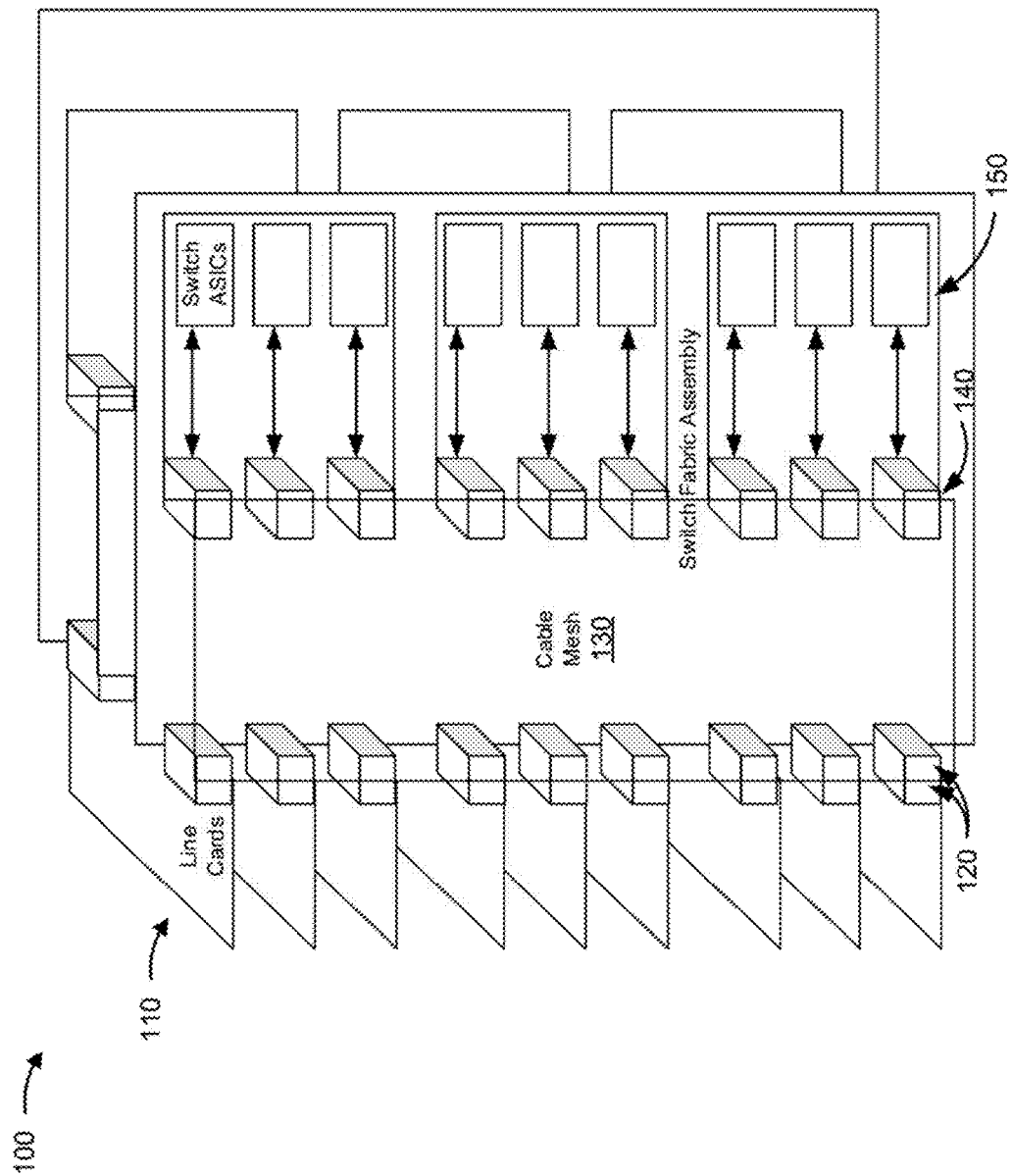
FIG. 1A is a diagram of an overview of an example implementation described herein.

The following detailed description of example implementations refers to the accompanying drawings. The same reference numbers in different drawings may identify the same or similar elements.

Network switches are capable of handling many connections for a variety of different types of devices, including server computers, personal computers, printers, storage devices, routers, and/or the like. Physically, a single network switch may often use multiple line cards, each offering multiple front-facing network input/output ports for connecting to various devices. The line cards interface with network fabric within the network switch, which may be implemented in a variety of ways, and which often includes either a backplane of network fabric built into a chassis and/or one or more fabric cards that include network fabric architecture (e.g., switch crossbars and/or switching application specific integrated circuits (ASICs)).

As the number of line cards used in network switches increases, the size of the fabric cards and/or backplane may also increase, leading to relatively long high-speed links between line cards and switch fabric. Longer links require more printed circuit board (PCB) material, including thicker circuit boards and more space taken up by the PCBs, which may increase switch production costs, and the longer links may also lead to signal loss due to attenuation. While attenuation may be addressed using signal amplification, repeaters, re-timers, and/or the like, such technology may further increase the cost of switch production (e.g., in both the cost of the signal amplification technology itself as well as additional energy and cooling costs incurred to use signal amplifiers).

Some implementations, described herein, provide a switch fabric assembly that includes a cable mesh for providing connectivity between line card connectors and switching ASICs of a switch fabric assembly (e.g., a system interface board (SIB)). For example, the cable mesh may connect each of the line card connectors of the switch fabric assembly to a switch connector for each of the switching ASICs. In the foregoing example, use of line card connectors may facilitate compatibility with a variety of line cards, the cable mesh may provide signal propagation over relatively long distances without suffering from attenuation and/or without using signal re-timers and/or repeaters, which may decrease signal latency, consume less PCB material, and enable the use of a longer switch fabric assembly than a standard fabric card.

In addition, the use of switch connectors opposite the line card connectors may, in some implementations, enable switch ASICs to be positioned relatively close to its corresponding switch connector, decreasing the distance signals travel on a PCB to the switching ASIC. Decreasing the distance signals travel between the switch connector and its corresponding switching ASIC may lead to using less PCB material to create the SIB that includes the switching ASIC, and the decreased distance signals travel may also reduce signal attenuation and lead to lower latency, e.g., as a result of the decreased signal propagation distance and/or differences in dielectric constants associated with materials used as a medium for signal propagation. Furthermore, in some implementations, the cable mesh assembly enables switching ASICs to be included in separate PCBs, which may provide further benefits, such as easier switch component manufacturing, construction, and/or replacement relative to larger switch PCBs that may include many switch ASICs, thicker PCB material, crisscross routing, permanent backplane integration, and/or increased signal attenuation.

Furthermore, in some implementations, the cable mesh may be configurable in a variety of ways, enabling a variety of different sizes and forms of the switch fabric assembly. The configurable nature of the cable mesh may also enable swapping switch fabric assemblies of different types, maintaining compatibility with existing line cards and obviating chassis replacement (e.g., as might be required in switch implementations with the switch fabric integrated with the backplane). The ability to provide a customizable switch fabric assembly, such as the switch fabric assembly described in the example implementations above and elsewhere herein, may enable switch providers to increase the line connectivity capabilities of network switches, increase network switch speed, and decrease costs associated with providing a network switch.

FIG. 1A is a diagram of an overview of an example implementation 100 described herein. As shown in FIG. 1A, example implementation 100 depicts line cards connected to switch fabric assemblies (e.g., as would be included inside a network switch chassis).

As shown in FIG. 1A, and by reference number 110, the example implementation 100 includes nine line cards. Line cards may include electronic circuitry on PCB material to provide an interface for network communications provided to and/or from a network switch by a cable (e.g., twisted pair, fiber optic, coaxial, and/or the like). For example, each line card may include multiple front-facing input/output (I/O) ports (not shown) for receiving cables and forwarding ASICs designed to facilitate forwarding network packets to the intended destination.

As further shown in FIG. 1A, and by reference number 120, each of the line cards connects to each switch fabric assembly via a pair of connectors (e.g., a switch fabric connector on the line card connecting to a line card connector included in the switch fabric assembly). The connector may be, for example, an orthogonal connector supporting differential pair signal crossover, or single-ended signaling, from the line card to the switch fabric assembly.

As further shown in FIG. 1A, and by reference number 130, the switch fabric assembly includes a cable mesh that provides cable connectivity between the line card connectors of the switch fabric assembly and switch connector groups shown by reference number 140 (e.g., wire-to-board connectors). In the example implementation 100, the cable mesh connects each of the nine line card connectors to each of the nine switch connector groups (e.g., using twisted pair cabling, fiber optic cabling, coaxial cabling, and/or the like).

As further shown in FIG. 1A, and by reference number 150, the example switch fabric assembly includes three system interface boards (SIBs), each including three switch ASICs that are each connected to one of the switch connector groups (e.g., using microstrip and/or stripline differential pair routing techniques on PCB). The switching ASICs determine where to forward network communications (e.g., using address data included in network communications) and forward communications back through the switch and out to the destination device.

Figure 1B:
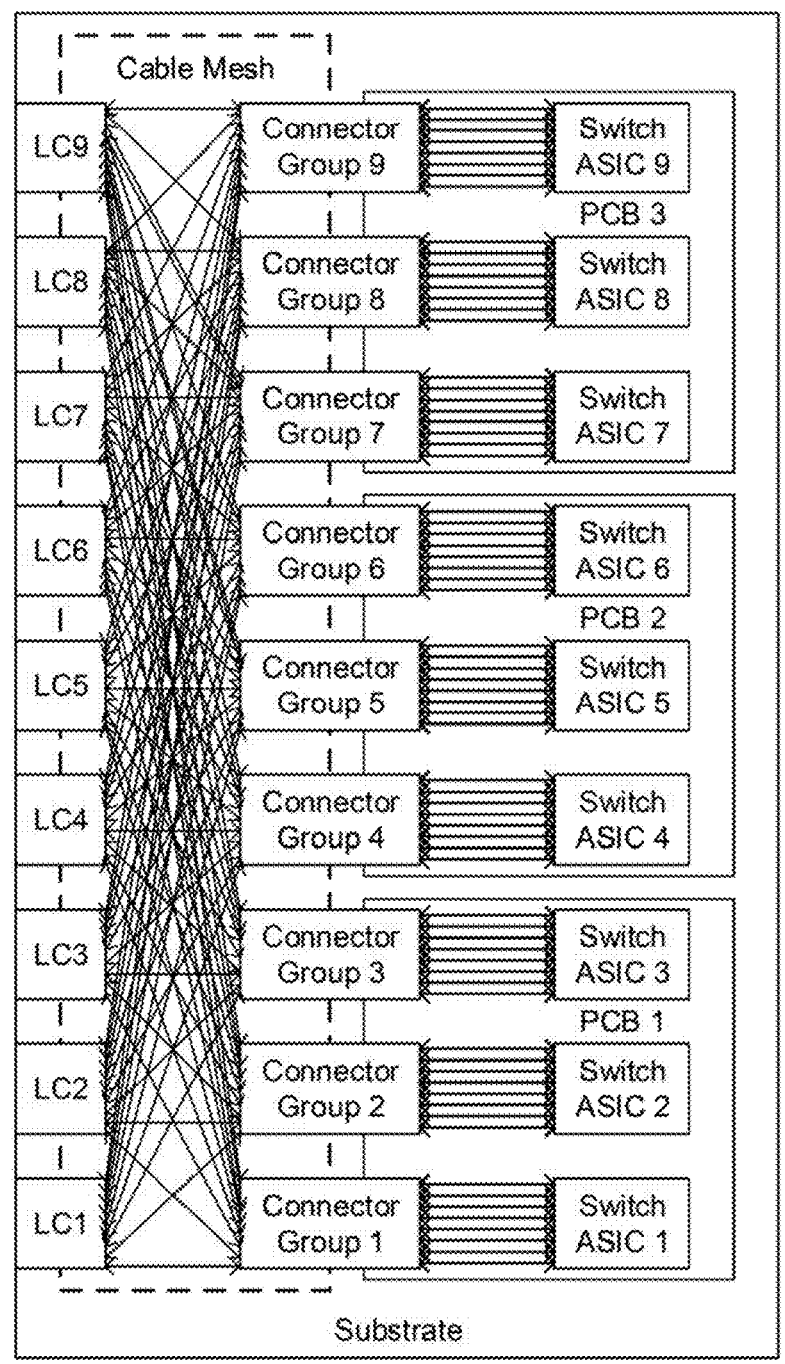
FIG. 1B is a diagram depicting a logical overview of the example implementation described with respect to FIG. 1A.

FIG. 1B is a diagram depicting a logical overview 160 of the example implementation 100 described with respect to FIG. 1A. For example, the logical overview 160 of the example switch fabric assembly includes nine line card connectors (e.g., depicted as LC1-LC9) that receive network communications from forwarding ASICs of a line card. Each line card connector is connected to each of the nine switch ASICs included in the example switch fabric assembly, e.g., using cable mesh and switch connector groups. For example, the cable mesh may include cables connecting each of the line card connectors to each of nine connector groups that each correspond to a switch ASIC, and each connector group may be connected to its corresponding switch ASIC on a PCB.

In an example situation, the example switch fabric assembly may receive a network packet, or frame, from a line card through line card connector LC1. The packet may be bound for switch ASIC 9 (e.g., the switch ASIC that includes the appropriate MAC address table for routing the packet). The packet is transmitted from LC1 to connector group 9, e.g., using a cable included in the cable mesh, and from connector group 9, the packet is transmitted to switch ASIC 9. After determining the destination for the packet, switch ASIC 9 may forward the packet back through the connector group and to one of the line card connectors based on the destination address of the packet.

The ability for the switch fabric assembly to use the cable mesh for connecting line card connectors to corresponding connector groups may improve performance of the switch fabric relative to using PCB-based connections. For example, mesh connections may be less expensive to build and maintain, mesh connections do not suffer from the same signal attenuation issues encountered using relatively long PCB-based connections, and energy requirements are reduced relative to PCB-based connections that might require additional components (e.g., signal amplifiers/repeaters) and power for those components, which may generate more heat and require more energy to cool. In addition, cable mesh may be configurable (e.g., by adding and/or removing cables), enabling the switch fabric assembly to be changed (e.g., by adding or removing SIBs with switch ASICs to the assembly). A configurable network fabric assembly may increase flexibility (e.g., in terms of compatibility with various switch configurations) and reduce costs associated with network switch changes (e.g., a network switch may be configured to an appropriate size and changed when desirable).

As indicated above, FIGS. 1A and 1B are provided merely as examples. Other examples are possible and may differ from what was described with regard to FIGS. 1A and 1B.

Figure 2:
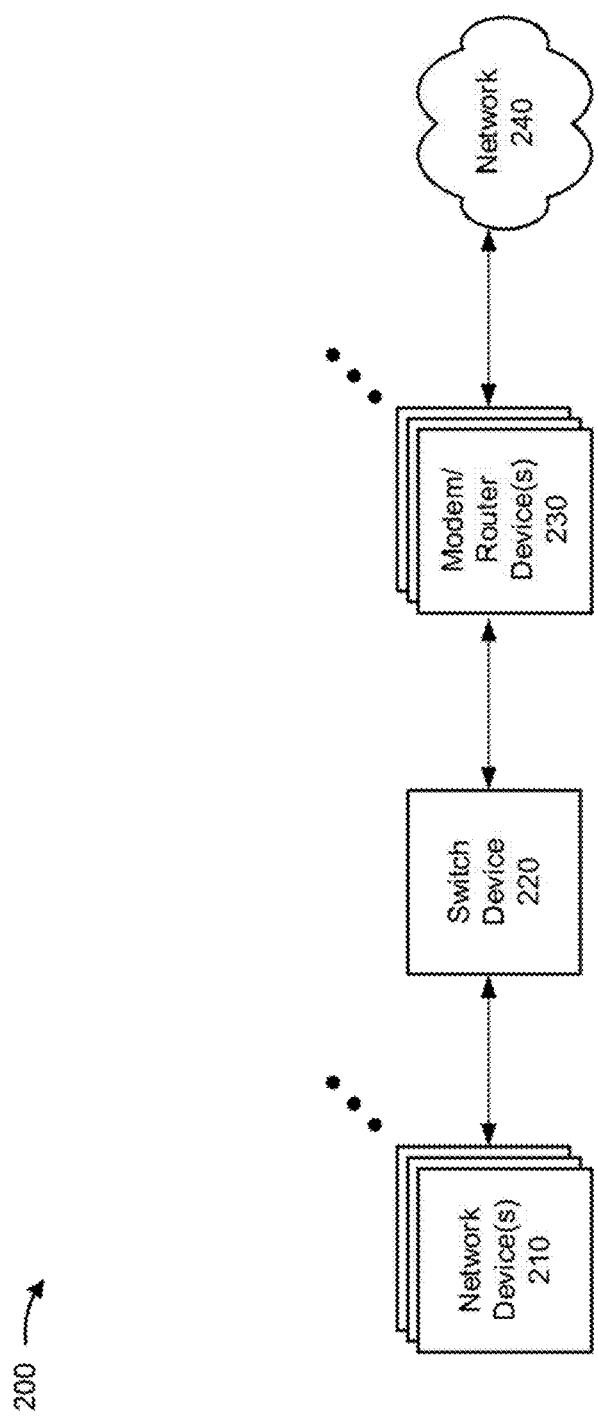
FIG. 2 is a diagram of an example environment in which a computer network switch fabric assembly, described herein, may be implemented.

FIG. 2 is a diagram of an example environment 200 in which a computer network switch fabric assembly, described herein, may be implemented. As shown in FIG. 2, environment 200 may include one or more network device (s) 210, a switch device 220, one or more modem/router device(s) 230, and a network 240. Devices of environment 200 may interconnect via wired connections, wireless connections, or a combination of wired and wireless connections.

Network device(s) 210 includes one or more devices capable of receiving, generating, storing, processing, and/or providing information associated with network communications. For example, network device 210 may include a communication and/or computing device, such as a mobile phone (e.g., a smart phone, a radiotelephone, etc.), a laptop computer, a server computer, a tablet computer, a handheld computer, a gaming device, a wearable communication device (e.g., a smart wristwatch, a pair of smart eyeglasses, etc.), a network attached data storage device, a computer network peripheral device, or a similar type of device.

Switch device 220 includes one or more devices capable of receiving, generating, storing, processing, and/or providing information associated with network communications. Switch device 220 is a computer networking device that connects devices (e.g., network device(s) 210 and/or modem/router device(s) 230) together on a computer network using packet switching to receive data, process data, and forward data to a destination device. Switch device 220 may include, for example, a chassis to which various components may be connected or fastened, including one or more line cards for receiving network cables, one or more switch fabric assemblies for determining the destination for network communications, and associated hardware (including hardware devices) for performing the switching functionality described above.

Modem/router device(s) 230 includes one or more devices capable of receiving, generating, storing, processing, and/or providing information associated with network communications. For example, a modem/router device 230 may include a network modem that provides network communications from a local network (e.g., such as a network in which switch device 220 operates) to an external network, including a wide area network (WAN), such as the Internet. As another example, a modem/router device 230 may include a network router that forwards network packets between computer networks, including between private networks, and between a local network and an external network. In some implementations, a single device may perform the functionality of both a router and modem.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
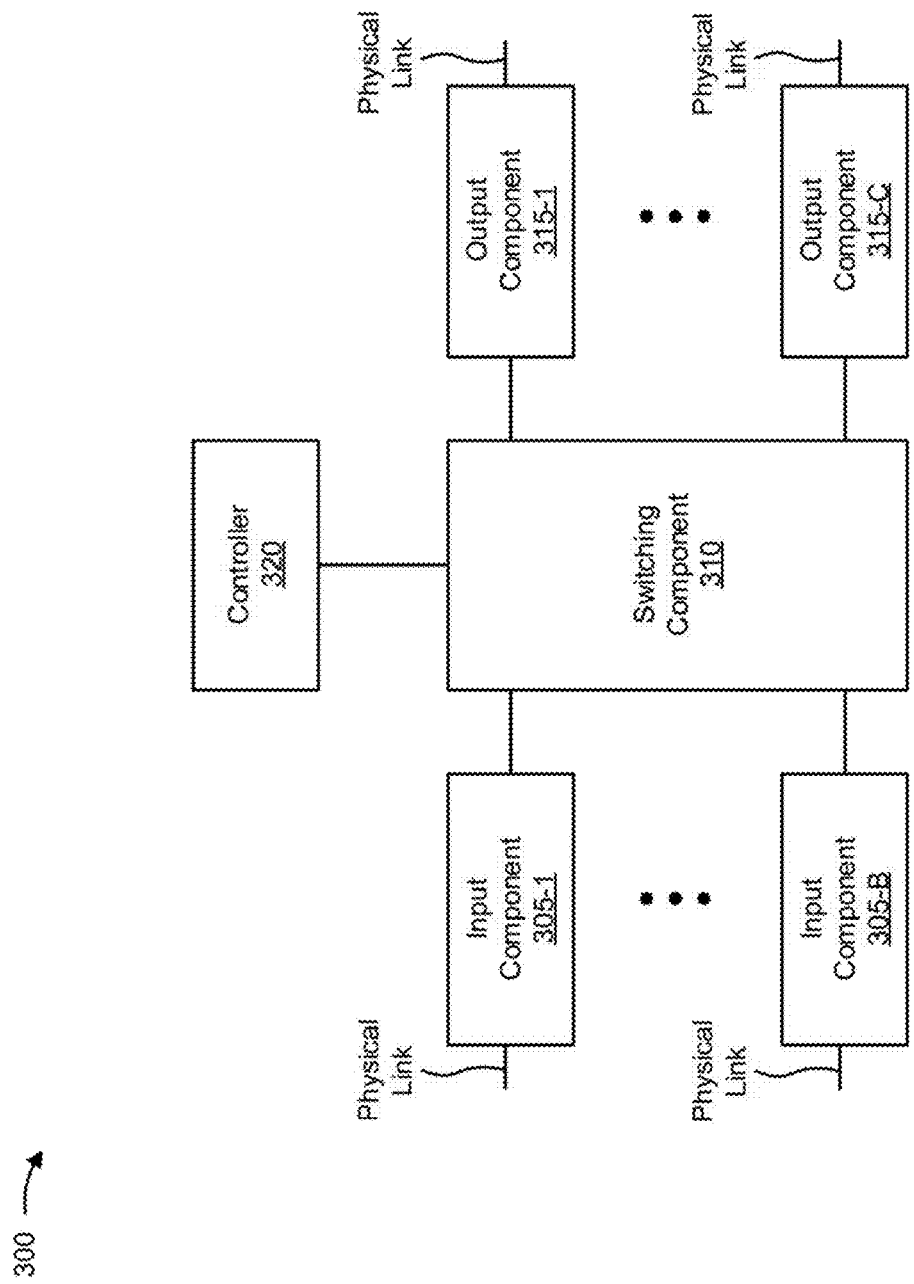
FIG. 3 is a diagram of example components of one or more devices of FIG. 2.

FIG. 3 is a diagram of example components of a device 300. Device 300 may correspond to switch device 220 and/or modem/router device(s) 230. In some implementations, switch device 220 and/or mode/router device(s) 230 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that may be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
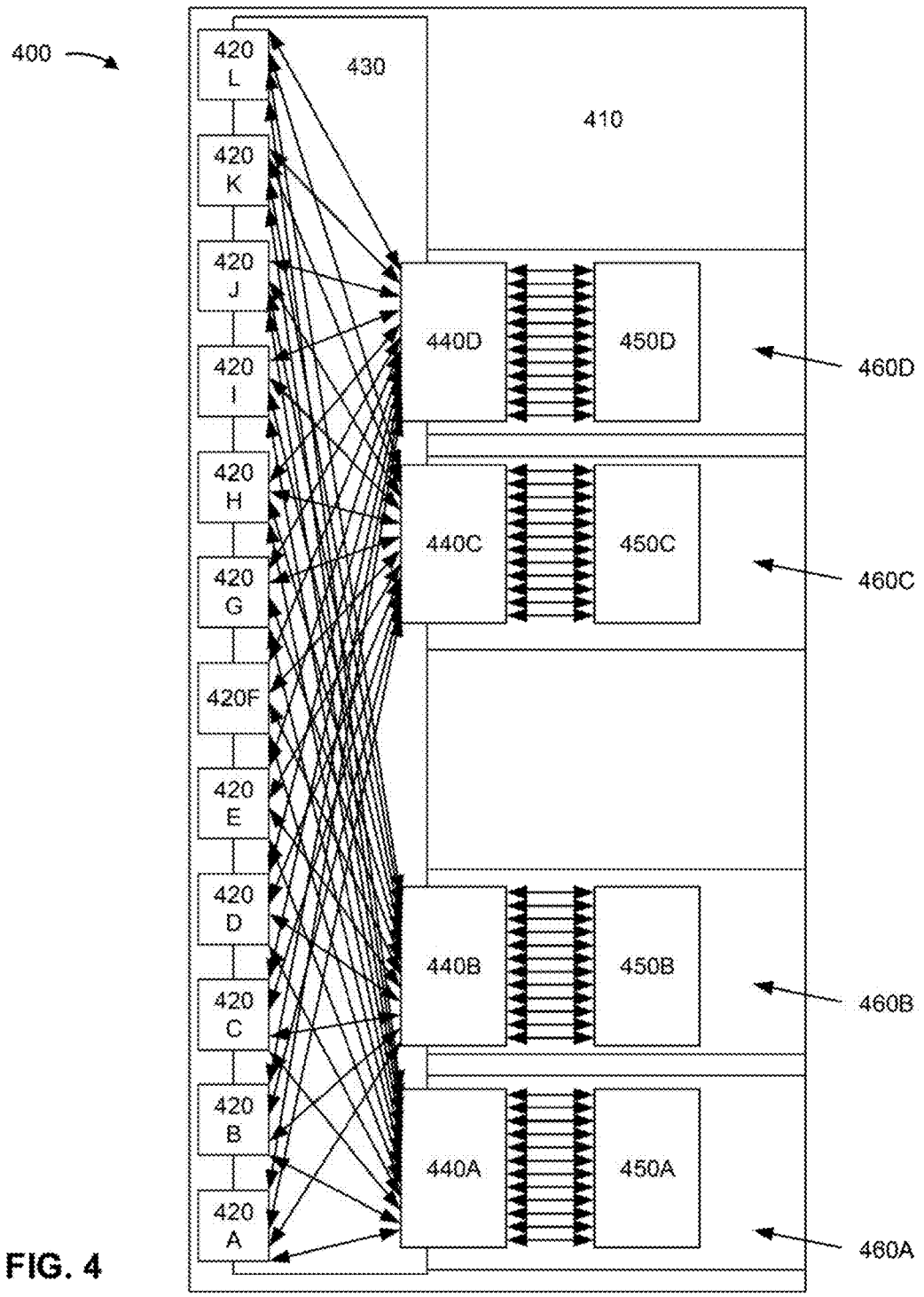
FIG. 4 is a diagram depicting a logical representation of an example switch fabric assembly.

FIG. 4 is a diagram depicting a logical representation of an example switch fabric assembly 400. In some implementations, the switch fabric assembly is included in switch device 220 and connected to one or more line cards to provide switching functionality for a network of network device(s) 210. In some implementations, the switch fabric assembly 400 may provide switching functionality that enables network device(s) 210 to communicate to an external network, such as network 240, e.g., via modem/router device(s) 230.

As shown in FIG. 4, switch fabric assembly 400 includes a substrate 410. The substrate 410 is designed to support other features of the switch fabric assembly 400 and, in some implementations, is designed to enable the switch fabric assembly to be fixed, permanently or removably, to a chassis of switch device 220. For example, the substrate 410 may include various fasteners or features for attaching the substrate to the chassis of a switch device 220 and for attaching various components of the switch fabric assembly 400 to the substrate 410. In some implementations, substrate 410 may be constructed using non-conductive materials, such as silicon, silicon dioxide, aluminum oxide, and/or the like.

As also shown in FIG. 4, the switch fabric assembly 400 includes one or more line card connectors, e.g., line card connectors 420A-420L in the example switch fabric assembly 400. Each line card connector 420A-420L provides an interface, and electrical connectivity, between the switch fabric assembly 400 and a line card. As noted above, in some implementations, line cards interface with network cables and use one or more forwarding ASICs to determine a destination associated with network packets received via the network cables. After determining a destination for a network packet, the line card may provide the network packet to the switch fabric assembly 400 via an interface (e.g., a switch fabric connector) with its corresponding line card connector 420A-420L. An example line card connector may be an orthogonal connector supporting differential pair signal crossover from the line card to the switch fabric assembly 400.

As also shown in FIG. 4, the switch fabric assembly 400 includes a cable mesh assembly 430. The cable mesh assembly 430 includes cables electrically connecting at least one of the line card connectors 420A-420L to at least one switch connector group, e.g., switch connector groups 440A-440D in the example switch fabric assembly 400. In some implementations, the cable mesh assembly includes cables for connecting each of the line card connectors 420A-420L to each of the switch connector groups 440A-440D. By way of example, cable mesh assembly 430 may include four cables connecting line card connector 420A to each of the four connector groups 440A-440D, four cables connecting line card connector 420B to each of the four connector groups 440A-440D, and so on. In some implementations, each cable (e.g., represented by lines with arrows in the cable mesh assembly 430) may include one or more wires, enabling communications between each forwarding ASIC of the line card and each switch ASIC of the switch fabric assembly 400.

The cable mesh assembly 430 may be constructed in a variety of ways and from a variety of materials. For example, cables included in the cable mesh assembly may include unshielded twisted pair cabling, shielded twisted pair cabling, fiber optic cabling, coaxial cabling, and/or the like. In some implementations the cable mesh assembly 430 includes a housing, such as a container or cover constructed using non-conductive material. The housing may be designed to contain the cables included in the cable mesh assembly 430 and may include fasteners and other components for organizing the cables and/or attaching the cable mesh assembly 430 to the switch fabric assembly 400.

In some implementations, the cable mesh assembly 430 may be configurable. For example, cables may be added and/or removed from the cable mesh assembly 430, enabling the cable mesh assembly 430 to be used for connecting any number of line card connectors to any number of switch connector groups. Cable mesh assembly 430 may be permanently or detachably coupled to switch fabric assembly 400, line card connectors and/or switch connector groups. As noted above, a configurable cable mesh assembly 430 reduces costs associated with making changes to network switches, such as adding or removing line cards and/or switch fabric architecture. In addition, a configurable cable mesh assembly 430 may provide flexibility in network switch implementations, providing signal transmission for potentially many more line cards and switching ASICs than traditional switch fabric architecture. As also note above, cables included in the cable mesh assembly 430 may be capable of carrying signals further, and with less attenuation, than other signal transmission methods, such as PCB-based traces.

As also shown in FIG. 4, the switch fabric assembly 400 includes one or more switch connector groups, e.g., switch connector groups 440A-440D. A switch connector group includes a connector designed to enable wires to electrically connect to a PCB, and may include a variety of different types of wire to board connectors or wire to PCB connectors, such as a twisted pair cable connector, coaxial cable connector, optical cable connector, and/or the like. In the example switch fabric assembly 400, each of the switch connector groups 440A-440D receives at least one cable from each of the twelve line card connectors 420A-420L.

As also shown in FIG. 4, the switch fabric assembly 400 includes one or more switch ASICs, e.g., switch ASICs

450A-450B. A switch ASIC is designed to forward network packets to their intended destination. A switch ASIC may forward a network packet, for example, using a table (e.g., a MAC address or content addressable memory (CAM) table) that identifies ports to which the network packet should be forwarded to be sent to a destination address (e.g., destination MAC address) specified in the network packet. As shown in the example switch fabric assembly 400, each switch ASIC is included on PCB material and provided with network packets via a switch connector group. For example, switch ASIC 450A receives network packets from switch connector group 440A, switch ASIC 450B receives network packets from switch connector group 440B, switch ASIC 450C receives network packets from switch connector group 440C, and switch ASIC 450D receives network packets from switch connector group 440D. While the example switch fabric assembly 400 depicts 12 lines (e.g., one for each line card connector 420A-420L), or traces, from its corresponding switch connector group, in some implementations each line may represent one or more traces.

As also shown in FIG. 4, the switch fabric assembly 400 includes one or more PCBs, e.g., PCBs 460A-460C. The PCBs of the switch fabric assembly 400 mechanically support and electrically connect electronic components of the switch fabric assembly, such as the switch connector groups and switching ASICs. While the example PCBs 460A-460D include only one switch connector group and one switch ASIC, in some implementations switch fabric assembly 400 may include a PCB with multiple switch ASICs and corresponding switch connector groups (e.g., as depicted in FIGS. 1A and 1B).

In some implementations, PCBs may be attached to the substrate 410, and in some implementations PCBs may be built into substrate 410. While substrate 410 is depicted as extending to cover the entire switch fabric assembly 400 (including the PCBs 460A-460B), in some implementations the substrate may be of a different size, e.g., providing support for only a portion of the components of switch fabric assembly 400.

In some implementations, PCBs with corresponding switch ASICs and switch connector groups may be added to and/or removed from a switch fabric assembly. For example, PCB 460D, including corresponding switch connector group 440D and switch ASIC 450D, may be detached from the cable mesh assembly 430 and substrate 410, removing it from the switch fabric assembly 400. As another example, an additional PCB, including a corresponding switch connector group and switch ASIC, may be attached to the cable mesh assembly 430 and substrate 410, e.g., in a manner designed to increase the switching capabilities of the switch fabric assembly 400.

Although FIG. 4 shows example components of switch fabric assembly 400, in some implementations, switch fabric assembly 400 may include additional components, fewer components, different components, or differently arranged components than those depicted in FIG. 4.

Some implementations, described herein, provide a switch fabric assembly capable of enabling signal propagation over relatively long distances without suffering from attenuation, which may decrease signal latency, consume less PCB material, and enable the use of a longer switch fabric assembly than a standard switch fabric card.

In addition, the use of switch connectors opposite the line card connectors may, in some implementations, enable switch connectors to be positioned relatively close to their corresponding switch ASIC, decreasing the distance signals travel on a PCB to the switch ASIC. Decreasing the distance signals travel between the switch connector and its corresponding switch ASIC may lead to using less PCB material to create the switch fabric assembly that includes the switching ASIC, and the decreased distance signals travel may also reduce signal attenuation and lead to lower latency.

Furthermore, the configurable nature of the switch fabric assembly may also enable reconfiguring and/or swapping switch fabric assemblies of different types, maintaining compatibility with existing line cards and obviating chassis replacement (e.g., as might be required in switch implementations with the switch fabric integrated with the backplane). The ability to provide a customizable switch fabric assembly, such as the switch fabric assembly described in the example implementations above, may enable switch providers to increase the line connectivity capabilities of network switches, increase network switch speed, and decrease costs associated with providing a network switch.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A switch fabric assembly comprising:
    at least one line card connector,
        each of the at least one line card connector providing electrical connectivity between a line card and one or more cables;
    a cable mesh assembly including the one or more cables, the one or more cable providing electrical connectivity between each of the at least one line card connector and each of at least one switch connector group;
at least one switch application specific integrated circuit (ASIC),
each of the at least one switch ASIC having electrical connectivity with one of the at least one switch connector group;
a substrate physically supporting at least one of:
the at least one line card connector,
the cable mesh assembly, or
the at least one switch connector group; and
at least one printed circuit board (PCB),
a PCB of the at least one PCB providing:
mechanical support for a first switch connector group of the at least one switch connector group and a first switch ASIC of the at least one switch ASIC, and
electrical connectivity between the first switch connector group and the first switch ASIC.

2. The switch fabric assembly of claim 1, wherein:
the at least one line card connector includes a plurality of line card connectors;
the at least one switch connector group includes a plurality of switch connector groups; and
the at least one switch ASIC includes a plurality of switch ASICs.

3. The switch fabric assembly of claim 2, wherein:
the cable mesh assembly includes, for each of the plurality of line card connectors, a plurality of cables,
the plurality of cables providing electrical connectivity to each of the plurality of switch connector groups.

4. The switch fabric assembly of claim 2, wherein:
each of the plurality of switch ASICs has electrical connectivity with each of the plurality of line card connectors.

5. The switch fabric assembly of claim 4, wherein:
the electrical connectivity between the plurality of switch ASICs and the plurality of line card connectors is provided by the cable mesh assembly and the plurality of switch connector groups.

6. The switch fabric assembly of claim 1, wherein:
a first end of the one or more cables is detachably coupled to the at least one line card connector; and
a second end of the one or more cables is detachably coupled to the at least one switch connector group.

7. The switch fabric assembly of claim 1, wherein each of the at least one line card connector comprises an orthogonal connector that supports at least one of:
differential pair signal crossover, or
single-ended signaling.

8. A network switch comprising:
a plurality of line cards; and
a switch fabric assembly electrically connected to the plurality of line cards,
the switch fabric assembly comprising:
for each of the plurality of line cards, a line card connector connected to the line card,
each line card connector providing electrical connectivity between the line card and one or more cables;
a cable mesh assembly including the one or more cables,
the one or more cables providing electrical connectivity between each line card connector and each of a plurality of switch connector groups;
a plurality of switch application specific integrated circuits (ASICs),
each of the plurality of switch ASICs being electrically connected to one of the plurality of switch connector groups; and
a plurality of printed circuit boards (PCBs),
a PCB of the plurality of PCBs providing:
mechanical support for a switch connector group of the plurality of switch connector groups and a switch ASIC of the plurality of switch ASICs, and
electrical connectivity between the switch connector group and the switch ASIC.

9. The network switch of claim 8, wherein:
each of the plurality of switch ASICs has electrical connectivity with each line card connector.

10. The network switch of claim 9, wherein:
the electrical connectivity between each of the plurality of switch ASICs and each line card connector supports differential signaling.

11. The network switch of claim 9, wherein:
the electrical connectivity between the plurality of switch ASICs and each line card connector is provided by the cable mesh assembly and the plurality of switch connector groups.

12. The network switch of claim 8, wherein:
for each cable of the one or more cables,
a first end of the cable is detachably coupled to a line card connector, and
a second end of the cable is detachably coupled to one of the plurality of switch connector groups.

13. The network switch of claim 8, wherein:
each line card connector provides electrical connectivity between traces of a corresponding line card of the plurality of line cards and a corresponding wire included in the one or more cables.

14. A network device comprising a switch fabric assembly, the switch fabric assembly including:
a printed circuit board (PCB) to wire connector,
the PCB to wire connector providing electrical connectivity between traces of a line card PCB and a cable;
a cable mesh assembly including the cable,
the cable providing electrical connectivity between the PCB to wire connector and a wire to PCB connector;
a switch application specific integrated circuit (ASIC),
the switch ASIC being electrically connected to the wire to PCB connector;
a substrate physically supporting at least one of:
the PCB to wire connector,
the cable mesh assembly, or
the wire to PCB connector; and
a switch PCB providing:
mechanical support for the wire to PCB connector and the switch ASIC, and
electrical connectivity between the wire to PCB connector and the switch ASIC.

15. The network device of claim 14, wherein:
the switch ASIC has electrical connectivity with the PCB to wire connector.

16. The network device of claim 15, wherein:
the electrical connectivity between the switch ASIC and the PCB to wire connector supports differential signaling.

17. The network device of claim 15, wherein:
the electrical connectivity between the switch ASIC and the PCB to wire connector is provided by the cable mesh assembly and the wire to PCB connector.

18. The network device of claim 14, wherein:
a first end of the cable is detachably coupled to the PCB
to wire connector, and
a second end of the cable is detachably coupled to the wire
to PCB connector.
19. The network device of claim 14, further comprising:
a line card connected to the PCB to wire connector,
the line card including a forwarding ASIC,
the forwarding ASIC being electrically connected to
the switch ASIC.
20. The network device of claim 14 wherein:
the cable comprises one of:
unshielded twisted pair cable,
shielded twisted pair cable,
fiber optic cable, or
coaxial cable.

* * * * *